United States Patent [19]
Yasuda et al.

[11] Patent Number: 5,919,555
[45] Date of Patent: Jul. 6, 1999

[54] ANTI-REFLECTION FILM AND DISPLAY DEVICE HAVING THE SAME

[75] Inventors: Tomokazu Yasuda; Tsukasa Yamada; Hirohisa Hokazono, all of Kanagawa, Japan

[73] Assignee: Fuji Photo Film Co., Ltd., Minami-Ashigara, Japan

[21] Appl. No.: 08/964,112

[22] Filed: Nov. 5, 1997

[30] Foreign Application Priority Data

Nov. 6, 1996 [JP] Japan ................................ 8-294241
May 19, 1997 [JP] Japan ................................ 9-128993

[51] Int. Cl.$^6$ ......................................... B32B 9/00
[52] U.S. Cl. ..................... 428/206; 428/143; 428/147; 428/308.4; 428/314.8; 428/409; 428/411.1; 428/412; 428/421; 428/422; 428/423.7; 427/71; 427/202; 427/163.1; 427/165; 359/580; 359/582; 359/589
[58] Field of Search ................................ 428/143, 147, 428/421, 422, 308.4, 206, 411.1, 314.8, 423.7, 412, 409; 359/609, 589, 582, 580, 601; 427/71, 163.1, 165, 202, 203, 164

[56] References Cited

U.S. PATENT DOCUMENTS 4,904,525  2/1990  Taniguchi et al. ..................... 428/328
5,225,244  7/1993  Aharoni et al. ........................ 427/240

FOREIGN PATENT DOCUMENTS 7-92305   4/1995  Japan .
7092305   4/1995  Japan .

*Primary Examiner*—William Krynski
*Assistant Examiner*—Abraham Bahta
*Attorney, Agent, or Firm*—Burns, Doane, Swecker & Mathis, LLP

[57] ABSTRACT

An anti-reflection film comprises a transparent support and a low refractive index layer. The low refractive index layer has a refractive index of not higher than 1.45. The low refractive index layer comprises a binder polymer and micro polymer particles. The micro polymer particles are superposed upon each other to form micro voids surrounded by the particles. The micro polymer particles have a mean particle size in the range of 5 to 200 nm. According to the first embodiment of the present invention, the particles comprise a cross-linked polymer. According to the second embodiment of the present invention, the particles comprise a polymer cross-linked to the binder polymer.

20 Claims, 1 Drawing Sheet

Figure
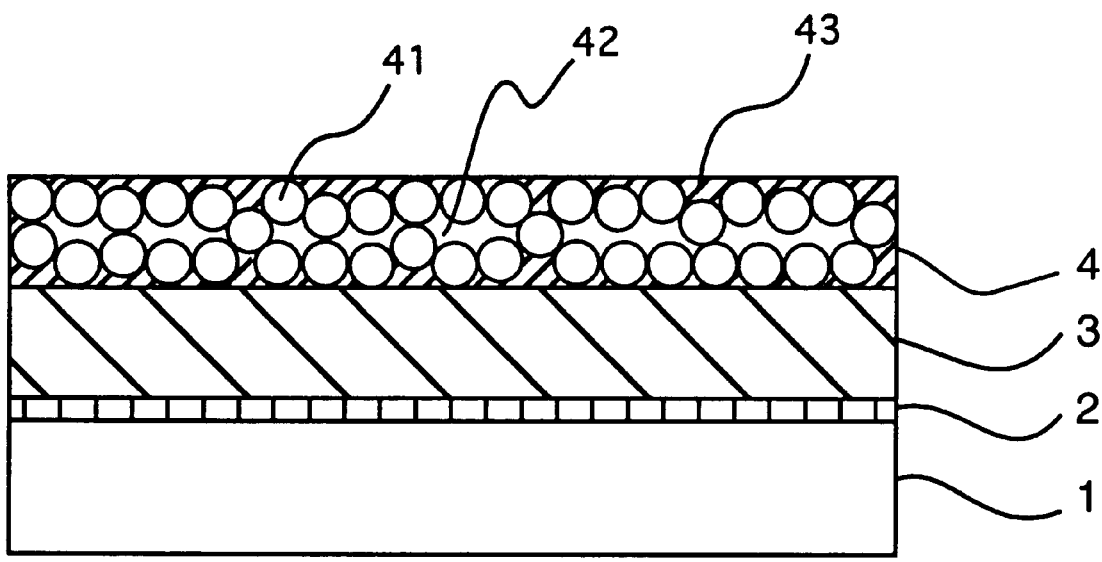

ANTI-REFLECTION FILM AND DISPLAY DEVICE HAVING THE SAME

FIELD OF THE INVENTION

The present invention relates to an anti-reflection film suitable for lowering reflection of light on a displaying surface of a display device. The invention also relates to a display device provided with the anti-reflection film.

BACKGROUND OF THE INVENTION

As anti-reflection films for visible light, multi-layered films wherein plural transparent layers made of metal compounds (e.g., metal oxides) are superposed one on another have been employed. In the case that a monolayer film is employed instead of the multi-layered film, the monolayer film cannot effectively lower reflection of light having wide wavelength region (e.g., visible light), though the monolayer film can lower reflection of monochromatic light.

In the multi-layered film, increase of the number of the layers can enlarge a wavelength region of light to which the multi-layered film can apply. Therefore, the known anti-reflection film is the multi-layered film composed of two or more metal oxide layers which are deposited by means of deposition. However, formation of the multi-layered film requires a complicated process comprising a number of physical or chemical deposition procedures which correspond to the number of the metal compound layers having predetermined refractive index and thickness, under highly precise control of the thickness for each layer. Further, on the multi-layered film, a fluororesin layer is needed to be formed to improve stain resistance (e.g., resistance to formation of fingerprint onto the surface of the film).

Alternatively to the multi-layered film, it is known to use, as the anti-reflection film, a film in which refractive indices to air gradually vary in the thickness direction. Japanese Patent Provisional Publication No. 2(1990)-245702 describes an anti-reflection film comprising $MgF_2$ micro particles and $SiO_2$ micro particles having refractive index between those of glass and $MgF_2$, in which blending ratio of the $MgF_2$ micro particles and $SiO_2$ micro particles varies in the thickness direction. In more detail, the anti-reflection film is prepared by coating a liquid containing a mixture of the $MgF_2$ micro particles and $SiO_2$ micro particles on a glass plate so as to reduce a ratio of the $SiO_2$ micro particles to $MgF_2$ micro particles. Thus formed anti-reflection film shows a little variation of refractive indices between its bottom and the upper surface of the glass plate. Therefore, the anti-reflection film shows a high anti-reflection effect.

Japanese Patent Provisional Publication No. 5(1993)-13021 also describes an anti-reflection film comprising two layers of $MgF_2$ micro particles and $SiO_2$ micro particles dispersed in ethyl silicate, a first layer containing $MgF_2$ micro particles and $SiO_2$ micro particles at ratio of 7/3 and a second layer containing $MgF_2$ micro particles and $SiO_2$ micro particles at ratio of 1/1. The first layer has a refractive index of 1.42 and the second layer has a refractive index of 1.44. Thus, the anti-reflection film does not show a satisfactory anti-reflection effect.

Japanese Patent Provisional Publication No. 7(1995)-92305 describes an anti-reflection film which comprises polymer particles (e.g., refractive index: 1.428) composed of a core and shell therearound and which has a structure composed of an uneven surface portion of a low refractive index comprising air and the polymer particles and a portion comprising only the polymer particles. The core is composed of copolymer of methyl methacrylate, methacrylic acid, trifluoroethyl acrylate and N-isobutoxymethyl acrylate, and the shell is composed of copolymer of styrene, acrylic acid and butyl acrylate.

Japanese Patent Provisional Publication No. 7(1995)-168006 describes an anti-reflection film which has a structure composed of an uneven surface portion of a low refractive index comprising air and particles (e.g., $MgF_2$), a portion (intermediate refractive index) comprising only the particles thereunder, and a portion comprising the particles and binder.

Japanese Patent Provisional Publications No. 2(1990)-245702, No. 5(1993)-13021, No. 7(1995)-92305 and No. 7(1995)-168006 mentioned above, all describe a film in which the refractive indices gradually vary in the thickness direction. However, the preparation of these films require complicated procedures and skilled art, and further the films do not show a satisfactory anti-reflection effect.

SUMMERY OF THE INVENTION

The problems of the known anti-reflection films can be solved by forming micro voids surrounded by particles. An improved anti-reflection film comprises a transparent support and a specific low refractive index layer. The low refractive index layer comprises a binder polymer and micro polymer particles. The micro polymer particles are superposed upon each other to form micro voids surrounded by the particles.

The improved anti-reflection film shows a high anti-reflection effect, which is obtained by the micro voids formed in the low refractive index layer. Further, the film can be prepared by a simple process. Furthermore, an image display device provided with the anti-reflection film can also be prepared by a simple process.

However, the applicants note a problem of the improved anti-reflection film. The micro voids formed in the low refractive index layer degrade the mechanical strength of the layer.

An object of the present invention is to improve the mechanical strength of the low refractive index layer containing micro voids.

The present invention provides an anti-reflection film of the first embodiment comprising a transparent support and a low refractive index layer having a refractive index of not higher than 1.45, said low refractive index layer comprising a binder polymer and micro polymer particles, said micro polymer particles being superposed upon each other to form micro voids surrounded by the particles, and said micro polymer particles having a mean particle size in the range of 5 to 200 nm, wherein the particles comprise a cross-linked polymer.

The invention also provides a display device having a display surface covered with the anti-reflection film of the first embodiment defined above.

The invention further provides an anti-reflection film of the second embodiment comprising a transparent support and a low refractive index layer having a refractive index of not higher than 1.45, said low refractive index layer comprising a binder polymer and micro polymer particles, said micro polymer particles being superposed upon each other to form micro voids surrounded by the particles, and said micro polymer particles having a mean particle size in the range of 5 to 200 nm, wherein the particles comprise a polymer cross-linked to the binder polymer.

The invention furthermore provides a display device having a display surface covered with the anti-reflection film of the second embodiment defined above.

According to the present invention, the mechanical strength of the low refractive index layer is enhanced by a cross-link between polymers. The low refractive index layer contain two polymers, namely the polymer of the particles and the binder polymer. According to the first embodiment of the invention, the polymers of the particles are cross-linked to each other. According to the second embodiment of the invention, the polymer of the particles are cross-linked to the binder polymer.

BRIEF DESCRIPTION OF THE DRAWINGS

FIGURE is a cross-sectional view schematically showing a representative example of the anti-reflection film of the present invention.

DETAILED DESCRIPTION OF THE INVENTION

[Layered Structure]

The anti-reflection film comprises a transparent support and a low refractive index layer having a refractive index of not higher than 1.45. The low refractive index layer comprises a binder polymer and micro polymer particles. The micro polymer particles are superposed upon each other to form micro voids surrounded by the particles. The micro polymer particles have a mean particle size in the range of 5 to 200 nm.

A high refractive index layer having a refractive index of not lower than 1.6 is preferably provided between the transparent support and the low refractive index layer. A hard coating layer is also preferably provided between the transparent support and the low refractive index layer or the high refractive index layer.

Figure is a cross-sectional view schematically showing a representative example of the anti-reflection film of the present invention. The anti-reflection film shown in the Figure comprises a transparent support (1), a hard coating layer (2), a high refractive index layer (3) and a low refractive index layer (4) in the order. The low refractive index layer (4) comprises a binder polymer (41) and micro polymer particles (43). The micro polymer particles (43) are superposed upon each other to form micro voids (42) surrounded by the particles (43).

The high refractive index layer and the low refractive index layer preferably satisfy the following formulas:

(High refractive index layer)

$$m/4\lambda \times 0.7 < n_1 d_1 < m/4\lambda \times 1.3$$

(Low refractive index layer)

$$n/4\lambda \times 0.7 < n_2 d_2 < n/4\lambda \times 1.3$$

in which m represents a positive integer (generally 1, 2 or 3), $n_1$ represents a refractive index of the high refractive index layer, $d_1$ represents a thickness (nm) of the high refractive index layer, n represents a positive odd number (generally 1), $n_2$ represents a refractive index of the low refractive index layer, and $d_2$ represents a thickness (nm) of the low refractive index layer. The refractive index ($n_1$) of the high refractive index layer is higher by at least 0.05 than that of the transparent film, and the refractive index ($n_2$) of the low refractive index layer is lower by at least 0.05 (preferably 0.1) than that of the high refractive index layer and lower by at least 0.05 than that of the transparent film. Further, $n_1$ generally is not lower than 1.6, and is preferably in the range of 1.6 to 1.7.

The above-mentioned formulas are described in Japanese Patent Provisional Publication No. 59(1984)-50401.

[Low Refractive Index Layer]

The low refractive index layer contains particles and a binder polymer. The particles generally arranged in plane direction in the thickness of one particle to form one particle layer, and several particle layers are superposed to form the low-refractive layer. The micro voids formed by the surrounding particles are generally formed uniformly in void size and in interval because the sizes of the particles are almost the same one another. The air contained in the micro voids has a refractive index of 1.00, while the polymers of the low refractive index layer generally have a refractive index of 1.25 to 1.45. The low-refractive layer generally shows an intermediate value between a refractive index of air and that of the particles. Thus, the refractive index of the low refractive index layer can be lowered by increasing the volume fraction of the micro voids through using fine particles and forming micro voids between the fine particles. The mean particle size of the particles generally is in the range of 5 to 200 nm, preferably 5 to 70 nm, and more preferably 5 to 50 nm. The low-refractive index layer has a thickness generally in the range of 50 to 400 nm, and preferably in the range of 50 to 200 nm.

The present invention is characterized in that the polymers used in the low refractive index layer are crosslinked. The cross-link can be formed (a) between the polymers of a particle, (b) between the polymer of a particle and the binder polymer, (c) between the polymer of a particle and the polymer of another particle, or (d) between the binder polymers. The first embodiment relates to the cross-link of (a). The second embodiment relates to the cross-link of (b). The cross-link of (a) can be combined with the cross-link of (b). Further, the cross-link of (a) or (b) can be combined with the cross-link of (c) or (d).

The cross-link of (a) is introduced into the polymers before forming the low refractive index layer. The cross-link of (a) can be formed by polymerizing monomers having two or more polymerizable functional group. On the other hand, the cross-link of (b), (c) or (d) is introduced into the polymers after forming the low refractive index layer. The cross-link of (b), (c) or (d) can be formed by a reaction between the polymers having a cross-linkable functional group. The reaction can be conducted by using a polymerization initiator (e.g., a photopolymerization initiator, a thermal polymerization initiator).

In the case that the particles have a core-shell structure, the cross-link of (a) is introduced into the polymer of the core, and the cross-link of (b) or (c) is introduced into the polymer of the shell.

According to the first embodiment of the present invention, the particles comprise a cross-linked polymer. At least 5 mole % of the repeating units of the polymer preferably have a branch to be cross-linked. The cross-linked polymer of the particles can be formed by polymerization of ethylenically unsaturated monomers. At least 5 mole % of the monomers have two or more ethylenically unsaturated bonds.

According to the second embodiment of the present invention, the particles comprise a polymer cross-linked to the binder polymer. The low refractive index layer of the second embodiment can be formed by coating a photopolymerization initiator, a binder polymer having a reactive group or monomers for the binder polymer and particles comprising a polymer having a reactive group, and irradiating the coated layer with ultraviolet ray to form the covalent bond between the binder polymer and the polymer of the particles. Each of the reactive groups of the binder polymer and the polymer of the particles preferably is an epoxy group or an ethylenically unsaturated bond.

In the case that at least 20 mole % (preferably 30 to 80 mole %, and more preferably 35 to 50 mole %) of the repeating units has a branch to be cross-linked, micro voids are formed inside the particles in addition to the micro voids surrounded by the particles. Accordingly, the volume of the micro voids can be increased by increasing the repeating units having a branch to be cross-linked.

The micro void is preferably formed in an amount of 3 to 50 volume % of the low refractive index layer, and preferably 5 to 35 volume %.

Further, the polymer of the particles preferably contains fluorine atoms in an amount of 15 to 75 weight %, more preferably in an amount of 25 to 75 weight %, further preferably in an amount of 35 to 75 weight %, and most preferably 45 to 70 weight %.

The polymers containing fluorine atoms are formed by polymerizing monomers containing a fluorine atom. Examples of the monomers include fluoroolefins (e.g., fluoroethylene, vinylidene fluoride, tetrafluoroethylene, hexafluoropropylene, perfluoro-2,2-dimethyl-1,3-dioxonol), completely or partially fluorinated alkyl acrylates or methacrylates and completely or partially fluorinated vinyl ethers. The fluorinated alkyl acrylates or methacrylates are preferred. Accordingly, the polymers containing fluorine atoms preferably comprises the following repeating units:

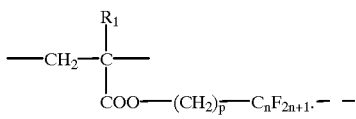

in which $R^1$ is hydrogen, methyl or a fluorine atom, and each of p and n independently is an integer.

The polymer of the particles may comprise repeating units containing no fluorine atom. The repeating unit is obtained by polymerizing a monomer containing no fluorine atom. Examples of the monomers include olefins (e.g., ethylene, propylene, isoprene, vinyl chloride, vinylidene chloride), acrylic esters (e.g., methyl acrylate, ethyl acrylate, 2-ethylhexyl acrylate), methacrylic esters (e.g., methyl methacrylate, ethyl methacrylate, butyl methacrylate), styrene, styrene derivatives (e.g., vinyl toluene, α-methylstyrene), vinyl ethers (e.g., methyl vinyl ether), vinyl esters (e.g., vinyl acetate, vinyl propionate), acrylamides (e.g., N-tert-butylacrylamide, N-cyclohexylacrylamide), methacrylamides and acrylonitriles.

The polymer of the particles used in the first embodiment of the invention further comprises repeating units having a branch to be cross-linked to each other. The repeating unit is formed by polymerizing a monomer having two or more ethylenically unsaturated groups. Examples of the monomers include dienes (e.g., butadiene, pentadiene, divinylcyclohexane), diacrylic, triacrylic or polyacrylic esters (e.g., ethylene glycol diacrylate, 1,4-cyclohexane diacrylate, dipentaerythritol hexaacrylate), dimethacrylic, triacrylic or polyacrylic esters (e.g., ethylene glycol dimethacrylate, 1,2,4-cyclohexane trimethacrylate, pentaerythritol tetramethacrylate), styrene derivatives (e.g., 1,4-divinylbenzene, 2-acryloylethyl 4-vinylbenzoate), bis-acrylamides (e.g., methylene bis-acrylamide) and bis-methacrylamides. The monomers may contain a fluorine atom.

The polymer of the particles used in the second embodiment of the invention further comprises repeating units having a branch to be cross-linked to a binder polymer. The repeating unit is formed by polymerizing a monomer having a cross-linkable reactive group (which remains after polymerization) and reacting the group with a reactive group of the binder polymer. Examples of the monomers include monomers having an epoxy group (e.g., glycidyl acrylate, glycidyl methacrylate) and a monomer having an ethylenically unsaturated bond (e.g., allyl methacrylate). The monomers may contain a fluorine atom.

The polymer particles can be prepared in the form of a polymer latex according to a conventional emulsion polymerization method, which comprises a step of emulsifying the monomer, a polymerization initiator and a dispersing agent in a medium. The medium preferably is water or a mixture of water and an organic solvent miscible with water. Examples of the organic solvents include methanol, ethanol and acetone. The amount of the monomer is preferably in the range of 5 to 40 wt. % of the medium. The amount of the polymerization initiator is preferably in the range of 0.05 to 5 wt. % of the monomer. The amount of the dispersing agent is preferably in the range of 0.1 to 20 wt. %. The mixture is stirred at 30 to 100° C. (preferably 60 to 90° C.) for 3 to 8 hours.

Examples of the polymerization initiators include inorganic peroxides (e.g., potassium persulfate, ammonium persulfate), azonitriles (e.g., sodium azobiscyanovalerate), azoamidines (e.g., 2,2'-azobis(2-methylpropionamide hydrochloride), cyclic azoamidines (e.g., 2,2'-azobis[2-(5methyl-2-imidazoline-2-yl)propane] hydrochloride) and azoamides (e.g., 2,2'-azobis{2-methyl-N-[1,1'-bis (hydroxymethyl)-2-hydroxyethyl]propionamide}). Potassium persulfate and ammonium persulfate are preferred.

A surface active agent (anionic, nonionic, cationic or amphoteric) can be used as the dispersing agent. An anionic surface active agent is preferably used as the dispersing agent.

A core-shell particle can be prepared in the form of a core-shell latex according to a seed emulsion polymerization method, which comprises steps of forming a core monomer emulsion, polymerizing the core monomer to form an aqueous dispersion of core polymer particles, dropwise adding a shell monomer to the dispersion, and polymerizing the shell monomer. The core latex can be obtained by the above-mentioned emulsion polymerization method. A commercially available latex can be used as the core latex.

At the step of adding the shell monomer, it is not preferred to further add a dispersing agent to the latex. An excess amount of the dispersing agent may form particles consisting of the shell polymer. The excess amount of the dispersing agent is preferably removed from the reaction solution by filtration.

The obtained particles can be stored in the form of powder. The powder can be obtained according to a conventional drying method, such as a freeze-drying method. The power can be obtained by a combination of agglomeration and filtration. The agglomeration can be caused by adding a strong acid or a salt to the particle dispersion or by repeating freeze and thaw of the dispersion.

Two or more kinds of particles can be used in combination in the low refractive index layer.

The glass transition temperature of the polymer of the particles preferably is higher than the glass transition temperature of the binder polymer. The difference between the glass transition temperatures preferably is not smaller than 5° C., more preferably is not smaller than 20° C.

The binder polymer preferably comprises repeating units having a branch to be cross-linked. The binder polymers are preferably cross-linked to each other or to the polymers of the particles. The repeating unit is formed by polymerizing a monomer having a cross-linkable reactive group (which remains after polymerization) and reacting the group with a reactive group of another binder polymer or a polymer of the particles. The reactive group preferably is an epoxy group or an ethylenically unsaturated bond (e.g., vinyl group). The binder polymer can be synthesized from a monofunctional monomer, a polyfunctional monomer, a polyfunctional oligomer or a polyfunctional polymer. The polyfunctional oligomer and the polyfunctional polymer can be used in the form of a latex. The polyfunctional oligomer is preferably used to synthesize the binder polymer.

In the case that the particles are dispersed in water, a water-soluble polymer is preferably used as the binder. In the case that the particles are dispersed in an organic solvent, a polymer soluble in the organic solvent is preferably used as the binder.

Examples of monomers or oligomers used to synthesize the binder polymers are shown below.

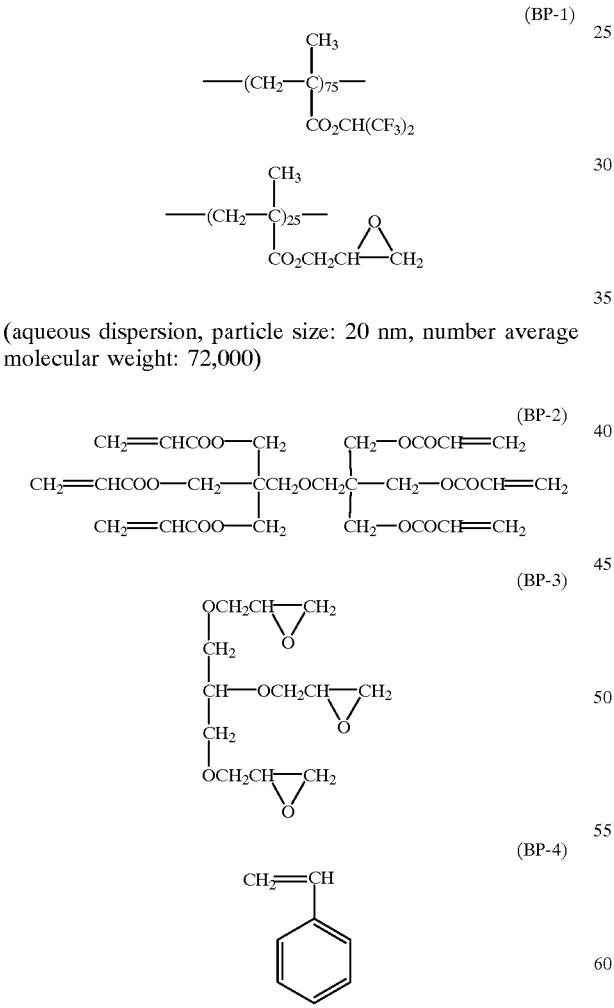

(aqueous dispersion, particle size: 20 nm, number average molecular weight: 72,000)

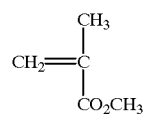
(BP-5)

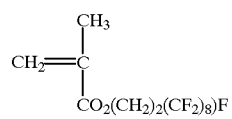
(BP-6)

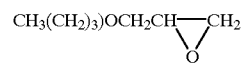
(BP-7)

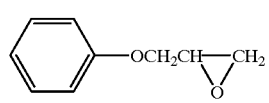
(BP-8)

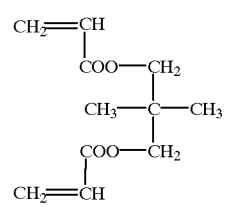
(BP-9)

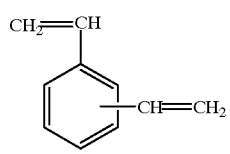
(BP-10)

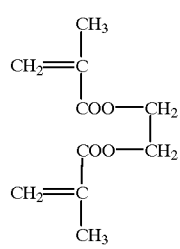
(BP-11)

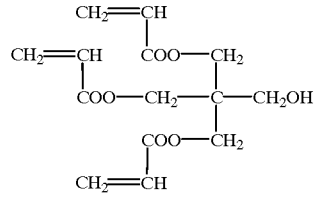
(BP-12)

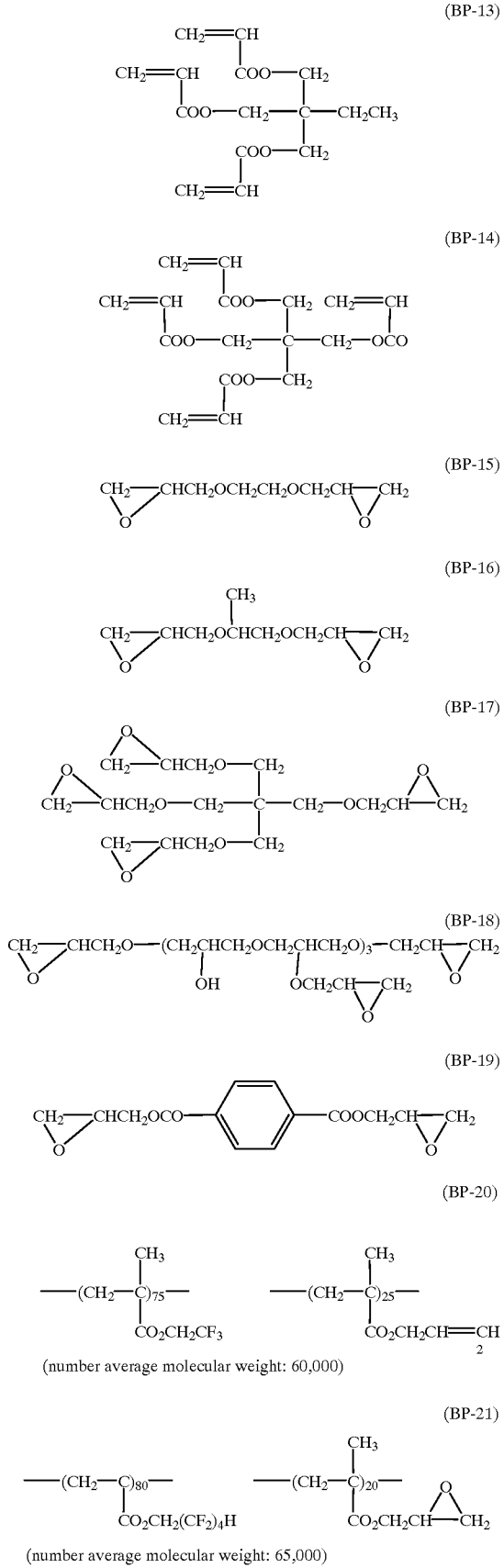

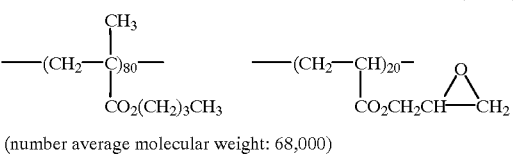

(number average molecular weight: 68,000)

Two or more binder polymers can be used in combination.

The weight ratio of the polymer particles to the binder polymer is preferably in the range of 30 to 95 wt. %, more preferably in the range of 50 to 90 wt. %.

According to the second embodiment of the invention, a cross-link is introduced between the polymer of the particle and the binder polymer. The cross-link is preferably formed by using a radical or cationic photopolymerization initiator. Examples of the radical photopolymerization initiators include carbonyl compounds (e.g., aromatic ketones, acetophenones, diketones), sulfur compounds (e.g., disulfides), organic peroxides (e.g., benzoyl peroxides) and azo compounds (e.g., azobisisobutyronitrile). Examples of the cationic polymerization initiators include onium salts such as diaryl iodonium salts, triaryl sulfonium salts and aromatic diazonium salts. Acetophenones and diaryl iodonium salts are preferred. The amount of the photopolymerization initiator is preferably in the range of 0.1 to 10 wt. %, and more preferably in the range of 0.5 to 7 wt. % based on the solid contents (the particles and the binder) of the low refractive index layer.

In the case that a small amount of binder is employed in the low refractive index layer, the binder is needed to be used so as not to fill up the micro voids. Preferred examples of binder include water-soluble resins such as polyvinyl alcohol and Polyoxyethylene; acrylic resins such as polymethyl acrylate and polymethyl acrylate; and cellulose derivatives such as nitrocellulose. Further, in the case that a polymerizable binder is employed as a binder for particles, the resultant layer of the particles can be cross-linked by ultraviolet radiation or heating. The binder is generally employed in the minimum amount for enabling the bonding between the particles. The binder (e.g., Polyvinyl alcohol) is generally employed in the amount of less than 25 weight %, preferably less than 10 weight %.

The low refractive index layer can be formed by coating a coating solution of the particles (e.g., latex) and a binder polymer (or monomers for the binder polymer) in a medium (e.g., water, organic solvent) on a transparent support or a high refractive index layer, and drying the coated layer. The coating is generally conducted according to a conventional coating method such as a dip coating method, an air knife coating method, a curtain coating method, a roller coating method, a wire bar coating method, a graver coating method or an extrusion coating method using a hopper (described in U.S. Pat. No. 2,681,294). Two or more layers (e.g., low and high refractive index layers) can be simultaneously coated on a transparent support. The simultaneous coating method is described in U.S. Pat. Nos. 2,761,791, 2,941,898, 3,508,947 and 3,526,528.

[Transparent Support]

The transparent support is generally made of a transparent polymer (plastic) film. Examples of the polymers include cellulose derivatives (e.g., diacetyl cellulose, triacetyl cellulose, propionyl cellulose, butyryl cellulose and acetyl propionyl cellulose), polyamides, polycarbonates (described in U.S. Pat. No. 3,023,101), polyesters (described in Japanese Patent Publication No. 48(1973)-40414, e.g., polyethylene terephthalate, polyethylene naphthalate, polybutylene terephthalate, poly-1,4-cyclohexanedimethylene terephthalate, polyethylene-1,2-diphenoxyethane-4,4'-dicarboxylate), polystyrene, polyolefins (e.g., polypropylene, polyethylene and polymethylpentene), polymethyl methacrylate, syndiotactic polystyrene, polysulfone, polyethersulfone, polyarylate, polyether ketone, polyether imide and polyoxyethylene.

The transparent support may have another function. For example, the support can function as a protective film of a polarizing plate.

[High Refractive Index Layer]

Examples of materials for forming a high refractive index layer having higher refractive index include organic materials such as thermoplastic resins (e.g., polystyrene, copolymers of styrene and other monomer polymerizable with styrene, polymer having an aromatic group, a heterocyclic group or a cycloalkyl or cycloalkenyl other than polystyrene, and polymers having a halogen atom other than fluorine atom), thermosetting resins (e.g., compositions containing as a hardener melamine resin, phenol resin or epoxy resin, compositions for forming polyurethane (e.g., combination of heterocyclic or aromatic polyisocyanate and polyol), and radical curable compositions containing resin or prepolymer modified by introducing a group having double bond into the above polymer or resin. The materials preferably have high film forming properties.

The high refractive index layer can be formed by using inorganic particles dispersed in an organic material. In this case, an organic material having a refractive index lower than the above materials can be employed because the inorganic particles generally have high refractive index. Naturally, the combination of inorganic particles and organic material enables the formation of layer having refractive index higher than that of layer of the above organic material. Any organic materials are employable in the combination so long as they have transparence and are capable of dispersing the inorganic particles. Examples of the organic materials include the above materials, vinyl resins, acrylic resins, polyesters, alkyd resins, cellulose derivatives, urethane resins, and silicon compound substituted with an organic group; and hardeners used together with these resins.

The silicon compounds are generally compounds represented by the formula:

$$R^{11}{}_a R^{12}{}_b SiX_{4-(a+b)}$$

in which each of $R^{11}$ and $R^{12}$ independently represents an alkyl group, an alkenyl group, an aryl group or a hydrocarbon group substituted with halogen, epoxy, amino, mercapto, methacryloyl or cyano; X represents one hydrolysis group selected from the group consisting of an alkoxy group, an alkoxyalkoxy group, a halogen atom and an acyloxy group; each of a and b is 0, 1 or 2 provided a+b is 1 or 2; or hydrolysis products thereof.

Preferred examples of the inorganic compounds forming the inorganic particles include oxides of metals such as aluminum, titanium, zirconium and antimony. The inorganic compounds are available in the form of particle or dispersion in water and/or organic solvent. The inorganic compound (particles) is dispersed in the above organic material and employed for forming the layer having higher refractive index.

As materials for forming the layer having higher refractive index, further employable are the following inorganic materials which have film-forming properties and can be dispersed in solvent or are per se in liquid form. Examples of the inorganic materials include alkoxides of various elements, salts of organic acids, coordination compounds bonded to compound capable of forming coordination (e.g., chelate compounds), and activated inorganic polymers. Preferred examples of the inorganic materials include metal alkoxides such as titanium tetraethoxide, titanium tetraisopropoxide, titanium tetra-n-propoxide, titanium tetra-n-butoxide, titanium tetra-sec-butoxide, titanium tetra-tert-butoxide, aluminum triethoxide, aluminum triisopropoxide, aluminum tributoxide, antimony triethoxide, antimony tributoxide, zirconium tetraethoxide, zirconium tetraisopropoxide, zirconium tetra-n-propoxide, zirconium tetra-n-butoxide, zirconium tetra-sec-butoxide and zirconium tetra-tert-butoxide; chelate compounds such as diisopropoxytitanium-bis(acetylacetonate), dibutoxytitanium-bis(acetylacetonate), diethoxytitanium-bis(acetylacetonate), bis(acetylacetone)zirconium, aluminum acetylacetonate, aluminum di-n-butoxide monoethylacetylacetate, aluminum diisopropoxide monomethylacetoacetate and tri-n-butoxide zirconium monoethylacetoacetate; and activated inorganic polymers comprising main component of zirconyl carbonate ammonium or zirconium. Further, various alkylsilicates or hydrolysis products thereof, and fine silica particles (especially silica gel in colloidal state), although they have relatively low refractive index, can be employed in combination with the above inorganic materials.

[Other Treatments or Layers]

The anti-reflection film can be so treated as to have anti-glare function (i.e., function scattering an incident light on the surface not to display a background view on the surface). For example, an anti-reflection film can be prepared by the steps of forming unevenness on the surface of the transparent support and forming the low refractive index layer on the surface. The formation of unevenness can be, for example, conducted by forming a layer containing inorganic or organic particles on the surface of the support. Otherwise, particles having particle size of 50 nm to 2 nm larger than that of the particles of the low refractive index layer are incorporated into a coating liquid for forming the low refractive index layer in the amount of 0.1 to 50 weight % based on the amount of the particles of the low refractive index layer. Thus unevenness can be formed on the top surface of the anti-reflection film. The anti-reflection film having the anti-glare function generally has a haze of 3 to 30%.

In the invention, an intermediate layer such as a hard coating layer, a moisture proof layer or an antistatic layer can be provided on the support. Examples of materials for forming the hard coating layer include polymer such as acrylic resin, urethane resin or epoxy resin and/or oligomer and monomer (e.g., UV-curable resin); or material containing silicon.

[Use of Anti-Reflection Film]

The anti-reflection film of the invention (preferably anti-reflection film having the anti-glare function) can be incorporated in a display device such as a liquid crystal display (LCD), a plasma display (PDP), an electroluminescence display (ELD) or a cathode ray tube display (CRT). The transparent support of the film (back surface of the film) is attached to the display surface. In the display device provided with the anti-reflection film of the invention, displayed image is easily observed.

The liquid crystal display provided with the anti-reflection film, for example, has the following structure:

A liquid crystal display comprising a liquid crystal cell which comprises a pair of substrates provided with a transparent electrode and nematic liquid crystal sealed therebetween, and a pair of polarizing sheets arranged on both sides of the cell; wherein at least one of the polarizing sheets is provided with the anti-reflection film thereon.

SYNTHESIS EXAMPLE 1
Synthesis of Polymer Particles (PP-1)

In a three neck flask of 200 ml having a cooling tube and a stirring device, a solution of 2 g of sodium dodecylbenzenesulfate in 90 ml of distilled water was placed. Further, a mixture of 17.8 g (70 mmol) of hexafluoroisopropyl methacrylate and 3.9 g (30 mmol) of divinylbenzene was added to the flask. The mixture was stirred at 200 rpm in a stream of nitrogen. After the flask was heated to 75° C., 2 ml of 8 wt. % aqueous solution of sodium persulfate was added to the mixture. The polymerization reaction was conducted for 1 hour. Further, 2 ml of 8 wt. % aqueous solution of sodium persulfate was added to the mixture, and the reaction was conducted for 1.5 hour. The reaction mixture was cooled to the room temperature, and dialyzed through a cellulose membrane (fractional molecular weight: 10,000) to remove the excess surface active agent and inorganic salts from the solution. The solution was filtered off to remove insoluble matters. Thus 198 g of white aqueous solution was obtained. The solution was in the form of a latex having the solid content of 8.9 wt. %. The average particle size of the latex was 114 nm. The latex contain porous spherical particles including micro voids in an amount of about 27 volume %. The particle size was measured according to a dynamic light scattering method by using a particle size analyzer (N4, Coaltar). The shape of the particle was observed with a scanning electron microscope. The volume % of the void was calculated from the refractive index (measured) of the particle and the refractive index (calculated) of the polymer.

SYNTHESIS EXAMPLE 2
Synthesis of Polymer Particles (PP-2)

In a three neck flask of 1 liter having a cooling tube and a stirring device, a solution of 20 g of sodium dodecylbenzenesulfate in 600 ml of distilled water was placed. Further, a mixture of 80 g (0.34 mol) of hexafluoroisopropyl methacrylate, 15 g (0.12 mol) of allyl methacrylate and 132 g (0.29 mol) of dipentaerythrytol hexaacrylate was added to the flask. The mixture was stirred at 200 rpm in a stream of nitrogen. After the flask was heated to 80° C., 10 ml of 8 wt. % aqueous solution of sodium persulfate was added to the mixture. The polymerization reaction was conducted for 2 hours while adjusting pH in the range of 6.3 to 7.7 by using 3 wt. % aqueous solution of sodium hydroxide. The reaction mixture was cooled to the room temperature, and dialyzed through a cellulose membrane (fractional molecular weight: 10,000) to remove the excess surface active agent and inorganic salts from the solution. The solution was filtered off to remove insoluble matters. Thus 1,244 g of white aqueous solution was obtained. The solution was in the form of a latex having the solid content of 17.3 wt. %. The average particle size of the latex was 154 nm. The latex contain porous spherical particles including micro voids in an amount of about 34 volume %. The particle size was measured according to a dynamic light scattering method by using a particle size analyzer (N4, Coaltar). The shape of the particle was observed with a scanning electron microscope. The volume % of the void was calculated from the refractive index (measured) of the particle and the refractive index (calculated) of the polymer.

SYNTHESIS EXAMPLES 3 to 6
Synthesis of Polymer Particles (PP-3 to PP-6)

Polymer particles PP-3 to PP-6 shown below were synthesized in the same manner as in the Synthesis Examples 1 and 2.

PP-1 (Spherical porous particles, solid content: 8.9 wt. %, average particle size: 114 nm, void: 27 volume %)
Hexafluoroisopropyl methacrylate (70 mole %)-divinylbenzene (30 mole %) copolymer PP-2 (Spherical porous particles, solid content: 17.3 wt. %, average particle size: 154 nm, void: 34 volume %)
Hexafluoroisopropyl methacrylate (45 mole %)-allyl methacrylate (16 mole %)-dipentaerythrytol hexaacrylate (39 mole %) copolymer PP-3 (Spherical porous particles, solid content: 9.5 wt. %, average particle size: 156 nm, void: 25 volume %)
1H,1H-perfluoro-n-octyl methacrylate (65 mole %)-divinylbenzene (35 mole %) copolymer PP-4 (Spherical porous particles, solid content: 11.2 wt. %, average particle size: 98 nm, void: 32 volume %)
Hexafluoroisopropyl methacrylate (50 mole %)-methacrylic acid (10 mole %)-1,3,5-cyclohexanetrimethanol trimethacrylate (20 mole %) copolymer PP-5 (Spherical porous particles, solid content: 15.5 wt. %, average particle size: 168 nm, void: 26 volume %)
1H,1H,2H,2H-perfluorodecyl methacrylate (40 mole %)-methyl methacrylate (20 mole %)-divinylbenzene (40 mole %) copolymer.

EXAMPLE 1

A mixture of the polymer particles (PP-1) and a hexafluoroisopropyl methacrylate latex (BP-31) was coated on a triacetyl cellulose film (thickness: 90 $\mu$m). The weight ratio of (PP-1) to (BP-31) was 80:20. The mixture was dried at 90° C. for 120 minutes to form a low refractive index layer having a thickness of 100 nm.

The refractive index and the average reflectance within the visible region (400 to 800 nm) of the obtained film were measured. Further, the mechanical strength (surface hardness) of the layer was measured and evaluated as the pencil grades by using a sapphire needle. The results are set forth in Table 3.

EXAMPLES 2 to 7

Anti-reflection films were prepared and evaluated in the same manner as in Example 1, except that the polymer particles and the binder polymer set forth in Table 1 were used. The results are set forth in Table 3.

TABLE 1

| | Polymer particles | | Binder polymer | |
|---|---|---|---|---|
| Film | No. | Amount | No. | Amount |
| Example 1 | PP-1 | 80 | BP-31 | 20 |
| Example 2 | PP-1 | 70 | BP-32 | 30 |
| Example 3 | PP-2 | 85 | BP-31 | 15 |
| Example 4 | PP-2 | 90 | BP-33 | 10 |
| Example 5 | PP-3 | 85 | BP-31 | 15 |
| Example 6 | PP-4 | 75 | BP-31 | 25 |
| Example 7 | PP-5 | 90 | BP-32 | 10 |

(Remark)
Amount: Weight parts
BP-31: Hexafluoroisopropyl methacrylate latex
BP-32: Hexafluoroisopropyl methacrylate (75 wt. %)-glycidyl methacrylate (25 wt. %) copolymer latex
BP-33: Polymethyl methacrylate latex

COMPARISON EXAMPLES 1 TO 3

Anti-reflection films were prepared and evaluated in the same manner as in Example 1, except that the polymer particles and the binder polymer set forth in Table 2 were used. The results are set forth in Table 3.

TABLE 2

| Film | Polymer particles | | Binder polymer | |
|---|---|---|---|---|
| No. | No. | Amount | No. | Amount |
| Comp. 1 | PP-51 | 80 | BP-31 | 20 |
| Comp. 2 | PP-52 | 85 | BP-32 | 15 |
| Comp. 3 | None | — | BP-31 | 100 |

(Remark)
PP-51: Methyl methacrylate (65 mole %)-divinylbenzene (35 mole %) copolymer latex
PP-52: Methyl methacrylate (50 mole %)-butyl methacrylate (50 mole %) copolymer latex

TABLE 3

| Anti-reflection film | Refractive index | Surface reflectance | Surface hardness |
|---|---|---|---|
| Example 1 | 1.32 | 0.4% | 3H |
| Example 2 | 1.32 | 0.4% | 4H |
| Example 3 | 1.33 | 0.5% | 3H |
| Example 4 | 1.32 | 0.4% | 3H |
| Example 5 | 1.32 | 0.3% | 4H |
| Example 6 | 1.32 | 0.4% | 3H |
| Example 7 | 1.33 | 0.6% | 4H |
| Comp. Ex. 1 | 1.42 | 4.0% | 2H |
| Comp. Ex. 2 | 1.48 | 4.5% | B |
| Comp. Ex. 3 | 1.34 | 0.8% | 4B |

EXAMPLE 8

(1) Formation of Hard Coating Layer (First Layer)

A toluene solution containing 5 wt. % of dipentaerythrytol hexaacrylate, 0.5 wt. % of a photopolymerization initiator (Irgacure 907, Ciba-Geigy) and 0.2 wt. % of a photosensitizer (Kayacure DETX, Nippon Kayaku Co., Ltd.) was coated on a triacetyl cellulose film (thickness: 90 μm) by using a wire bar to form a hard coating layer (thickness: 8 μm). The coated layer was dried and heated to 100° C. An ultraviolet ray was irradiated to the layer by using a high pressure mercury lamp (12 W/cm) for 1 minute to harden the layer. The layer was cooled to the room temperature.

(2) Formation of High Refractive Index Layer (Second Layer)

With 100 g of an n-butyl methacrylate-methacrylic acid copolymer latex HP-1 (copolymerization ratio: 80:20, average particle size: 63 nm, solid content: 12.5 wt. %), 25 g of tin oxide fine particles (Ishiwara Industries) were mixed. In 100 g of water, 6 g of dipentaerythrytol hexaacrylate, 0.5 g of a photopolymerization initiator (Irgacure 907, Ciba-Geigy), 0.2 g of a photosensitizer (Kayacure DETX, Nippon Kayaku Co., Ltd.) and 20 g of ethyl acetate were mixed and emulsified by using 1 g of sodium dodecylbenzenesulfonate. The obtained emulsion was added to the mixture, and the resulting mixture was stirred to form a coating solution.

The coating solution was coated on the hard coating layer by using a wire bar to form a high refractive index layer (thickness: 0.16 μm). The coated layer was dried and heated to 100° C. An ultraviolet ray was irradiated to the layer by using a high pressure mercury lamp (12 W/cm) for 1 minute to harden the layer. The layer was cooled to the room temperature.

(3) Formation of Low Refractive Index Layer (Third Layer)

In 100 g of water, 6 g of dipentaerythrytol hexaacrylate, 0.5 g of a photopolymerization initiator (Irgacure 907, Ciba-Geigy), 0.2 g of a photosensitizer (Kayacure DETX, Nippon Kayaku Co., Ltd.) and 20 g of ethyl acetate were mixed and emulsified by using 1 g of sodium dodecylbenzenesulfonate. The obtained emulsion was added to 87 g of the latex PP-1, and the resulting mixture was stirred to form a coating solution.

The coating solution was coated on the high refractive index layer by using a wire bar to form a high refractive index layer (thickness: 0.10 μm). The coated layer was dried and heated to 100° C. An ultraviolet ray was irradiated to the layer by using a high pressure mercury lamp (12 W/cm) for 1 minute to harden the layer. The layer was cooled to the room temperature.

The average reflectance within the visible region (400 to 800 nm) of the obtained film was measured. Further, the mechanical strength (surface hardness) of the layer was measured and evaluated as the pencil grades. The results are set forth in Table 4.

EXAMPLES 9 TO 12

Anti-reflection films were prepared and evaluated in the same manner as in Example 8, except that the polymer particles for the low refractive index layer and the polymer for the high refractive index layer set forth in Table 4 were used. The results are set forth in Table 4.

COMPARISON EXAMPLES 4 TO 5

Anti-reflection films were prepared and evaluated in the same manner as in Example 8, except that the polymer particles for the low refractive index layer set forth in Table 4 were used. The results are set forth in Table 4.

TABLE 4

| Anti-reflection film | Polymer of second layer | Particles of third layer | Surface reflectance | Surface hardness |
|---|---|---|---|---|
| Example 8 | HP-1 | PP-1 | 0.4% | 4H |
| Example 9 | HP-1 | PP-2 | 0.3% | 4H |
| Example 10 | HP-2 | PP-2 | 0.3% | 3H |
| Example 11 | HP-3 | PP-3 | 0.2% | 4H |
| Example 12 | HP-4 | PP-4 | 0.4% | 3H |
| Comp. 4 | HP-1 | PP-51 | 3.9% | 2H |
| Comp. 5 | HP-1 | PP-52 | 3.7% | 2H |

(Remark)
HP-1: n-Butyl methacrylate (80 wt. %)-methacrylic acid (20 wt. %) copolymer
HP-2: Methyl methacrylate (65 wt. %)-ethyl methacrylate (25 wt. %)-acrylic acid (10 wt. %) copolymer
HP-3: Benzyl methacrylate (50 wt. %)-methyl methacrylate (25 wt. %)-allyl methacrylate (20 wt. %)-methacrylic acid (5 wt. %) copolymer
HP-4: Methyl methacrylate (35 wt. %)-styrene (20 wt. %)-2-β-naphthylethyl methacrylate (15 wt. %)-allyl methacrylate (10 wt. %)-acrylic acid (10 wt. %) copolymer

SYNTHESIS EXAMPLE 7

Synthesis of Polymer Particles (PP-11)

In a three neck flask of 5 liters having a cooling tube and a stirring device, a solution of 30 g of sodium dodecylbenzenesulfate in 2.7 liters of distilled water was placed. Further, a mixture of 480 g of hexafluoroisopropyl methacrylate, 60 g of divinylbenzene and 60 g of glycidyl methacrylate was added to the flask. The mixture was stirred at 200 rpm in a stream of nitrogen. After the flask was heated to 75° C., a solution of 12 g sodium persulfate in 150 ml of water was added to the mixture. The polymerization reaction was conducted for 5 hours. The reaction mixture was cooled to the room temperature, and dialyzed through a cellulose membrane (fractional molecular weight: 10,000) to remove the excess surface active agent and inorganic salts from the solution. The solution was filtered off to remove insoluble matters. Thus 4,500 g of milky white aqueous solution was obtained. The solution was in the form of a latex having the solid content of 13.3 wt. %. The average particle size of the latex was 30 nm. The particle size was measured according to a dynamic light scattering method by using a particle size analyzer (N4, Coaltar).

SYNTHESIS EXAMPLE 8

Synthesis of Core Particles

In a three neck flask of 5 liters having a cooling tube and a stirring device, a solution of 30 g of sodium dodecylbenzenesulfate in 2.7 liters of distilled water was placed. Further, a mixture of 480 g of hexafluoroisopropyl methacrylate and 120 g of divinylbenzene was added to the flask. The mixture was stirred at 200 rpm in a stream of nitrogen. After the flask was heated to 75° C., a solution of 12 g sodium persulfate in 150 ml of water was added to the mixture. The polymerization reaction was conducted for 5 hours. The reaction mixture was cooled to the room temperature, and dialyzed through a cellulose membrane (fractional molecular weight: 10,000) to remove the excess surface active agent and inorganic salts from the solution. The solution was filtered off to remove insoluble matters. Thus 4,510 g of milky white aqueous solution was obtained. The solution was in the form of a latex having the solid content of 13.2 wt. %. The average particle size of the latex was 20 nm.

Synthesis of Polymer Particles (PP-18)

In a three neck flask of 100 ml having a cooling tube and a stirring device, 75.7 g of the core latex (solid content: 13.2 wt. %, solid amount: 10 g) and a solution of 0.022 g of sodium dodecylbenzenesulfate in 10 ml of distilled water were placed. Further, a mixture of 0.55 g of n-butyl methacrylate and 0.55 g of glycidyl methacrylate was added to the flask. The mixture was stirred at 200 rpm in a stream of nitrogen. The polymerization reaction was conducted at 75° C. for 4 hours. The reaction mixture was cooled to the room temperature, and filtered off to remove insoluble matters. Thus 90.3 g of white aqueous dispersion was obtained. The dispersion was in the form of a latex having the solid content of 11.6 wt. %. The average particle size of the latex was 25 nm.

SYNTHESIS EXAMPLES 9 TO 19

Polymer particles PP-12 to PP-17, PP-19, PP-20, PP-61, PP-62, PP-63 shown in Table 5 were synthesized in the same manner as in the Synthesis Examples 7 and 8.

TABLE 5

| Synthesis Example | Polymer Particles | Average particle size | Content of fluorine atom |
|---|---|---|---|
| 7  | PP-11 | 30 nm | 38.6 wt. % |
| 9  | PP-12 | 25 nm | 38.6 wt. % |
| 10 | PP-13 | 30 nm | 38.6 wt. % |
| 11 | PP-14 | 45 nm | 40.3 wt. % |
| 12 | PP-15 | 22 nm | 38.6 wt. % |
| 13 | PP-16 | 35 nm | 38.6 wt. % |
| 14 | PP-17 | 32 nm | 36.2 wt. % |
| 8  | PP-18 | 25 nm | 34.8 wt. % |
| 15 | PP-19 | 24 nm | 34.8 wt. % |
| 16 | PP-20 | 28 nm | 35.7 wt. % |
| 17 | PP-61 | 18 nm | 48.3 wt. % |
| 18 | PP-62 | 20 nm | 38.6 wt. % |
| 19 | PP-63 | 25 nm | 34.8 wt. % |

(Remark)

PP-11:

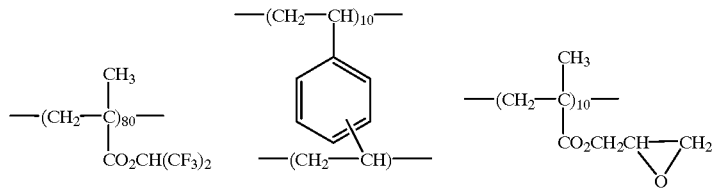

PP-12:

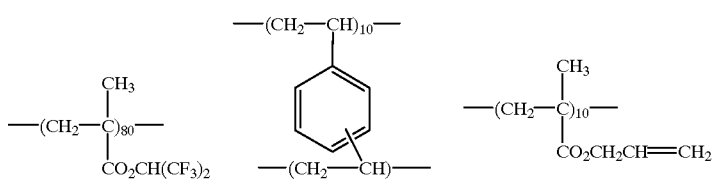

PP-13:

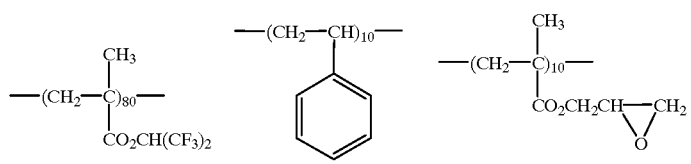

TABLE 5-continued
PP-14:
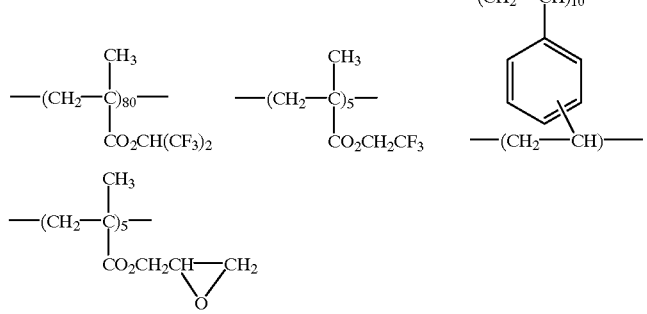
PP-15:
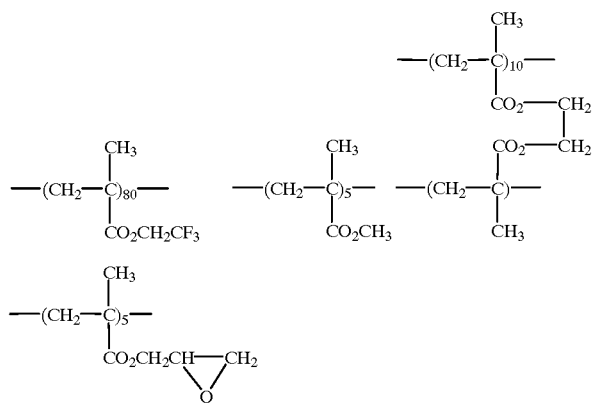
PP-16:
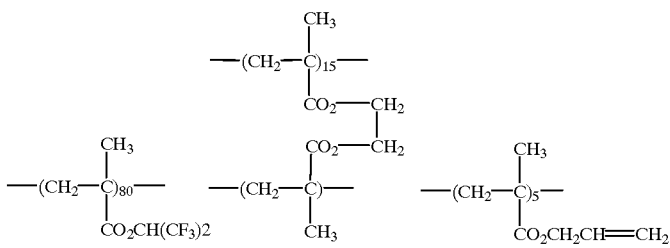
PP-17:
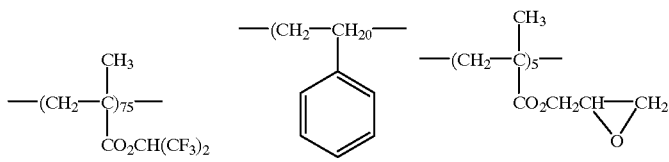
PP-18: (core, 90 wt. %)
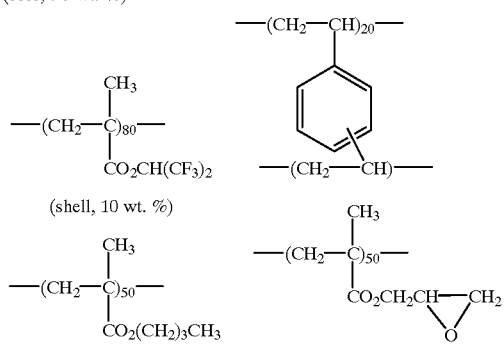
(shell, 10 wt. %)
PP-19: (core, 90 wt. %)

TABLE 5-continued
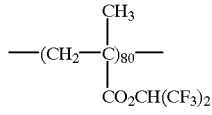
(shell, 10 wt. %)
PP-20:
(core, 80 wt. %)
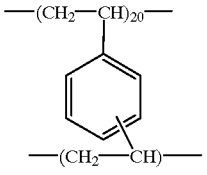
(shell, 20 wt. %)
PP-61:
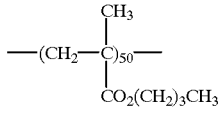
PP-62:
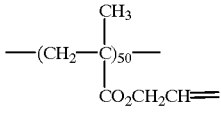
PP-63:
(core, 90 wt. %)
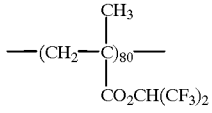
(shell, 10 wt. %)

EXAMPLES 13 to 26 AND COMPARISON EXAMPLES 6 TO 11

Anti-reflection films were prepared in the same manner as in Example 1, except that the polymer particles and the binder polymer set forth in Table 6 were used.

TABLE 6

| Film No. | Polymer particles | | Binder polymer | |
|---|---|---|---|---|
| | No. | Amount | No. | Amount |
| Example 13 | PP-11 | 90 | BP-3 | 10 |
| Example 14 | PP-11 | 80 | BP-3 | 20 |
| Example 15 | PP-12 | 95 | BP-2 | 5 |
| Example 16 | PP-12 | 90 | BP-2 | 10 |
| Example 17 | PP-13 | 90 | BP-1 | 10 |
| Example 18 | PP-14 | 90 | BP-3 | 10 |
| Example 19 | PP-15 | 90 | BP-1 | 10 |
| Example 20 | PP-15 | 90 | BP-3 | 10 |
| Example 21 | PP-16 | 90 | BP-2 | 10 |
| Example 22 | PP-17 | 90 | BP-1 | 10 |
| Example 23 | PP-18 | 90 | BP-3 | 10 |
| Example 24 | PP-18 | 80 | BP-3 | 20 |
| Example 25 | PP-19 | 90 | BP-2 | 10 |
| Example 26 | PP-20 | 90 | BP-1 | 10 |
| Comp. 6 | PP-10 | 100 | None | — |
| Comp. 7 | PP-61 | 80 | BP-1 | 20 |
| Comp. 8 | PP-12 | 100 | None | — |
| Comp. 9 | PP-62 | 80 | BP-2 | 20 |
| Comp. 10 | PP-19 | 100 | None | — |
| Comp. 11 | PP-63 | 80 | BP-3 | 20 |

(Remark)
BP-1: Hexafluoroisopropyl methacrylate (75 mole %)-glycidyl methacrylate (25 mole %) latex (average particle size: 20 nm)
BP-2: Dipentaerythrytol hexaacrylate
BP-3: Glycerol polyglycidyl ether (Denacol EX-314, Nagase Chemical Industries)

The refractive index and the average reflectance within the visible region (400 to 800 nm) of the obtained films were measured. Further, the volume % of the void of the low refractive index layer was calculated from the refractive index (measured) of the layer and the refractive index (calculated) of the polymers contained in the layer. Furthermore, the mechanical strength (surface hardness) of the layer was measured by using tissue paper and an eraser. The strength was evaluated as three grades A (not scratched with tissue paper and an eraser), B (scratched with an eraser, but not scratched with tissue paper) and C (scratched with the pencil or the tissue paper). The results are set forth in Table 7.

TABLE 7

| Film No. | Refraction | Reflectance | Void volume | Fluorine content | Surface hardness |
|---|---|---|---|---|---|
| Ex. 13 | 1.33 | 0.5% | 20% | 34.7% | A |
| Ex. 14 | 1.34 | 0.6% | 16% | 30.9% | A |
| Ex. 15 | 1.33 | 0.5% | 21% | 36.7% | A |
| Ex. 16 | 1.34 | 0.6% | 18% | 34.7% | A |
| Ex. 17 | 1.33 | 0.5% | 19% | 38.4% | A |
| Ex. 18 | 1.32 | 0.4% | 19% | 36.3% | A |
| Ex. 19 | 1.33 | 0.5% | 20% | 38.4% | A |
| Ex. 20 | 1.33 | 0.5% | 18% | 34.7% | A |
| Ex. 21 | 1.33 | 0.5% | 19% | 34.7% | A |
| Ex. 22 | 1.33 | 0.5% | 19% | 36.2% | A |
| Ex. 23 | 1.33 | 0.5% | 17% | 31.3% | A |
| Ex. 24 | 1.34 | 0.6% | 17% | 27.8% | A |
| Ex. 25 | 1.33 | 0.5% | 20% | 31.3% | A |
| Ex. 26 | 1.33 | 0.5% | 19% | 35.8% | A |
| Comp. 6 | 1.33 | 0.5% | 22% | 38.6% | C |
| Comp. 7 | 1.40 | 2.0% | 0% | 45.9% | C |
| Comp. 8 | 1.33 | 0.5% | 22% | 38.6% | C |
| Comp. 9 | 1.34 | 0.6% | 19% | 30.9% | C |
| Comp. 10 | 1.33 | 0.5% | 21% | 34.8% | B |
| Comp. 11 | 1.34 | 0.6% | 17% | 27.8% | B |

EXAMPLES 27 to 40 AND COMPARISON EXAMPLES 12 TO 17

Anti-reflection films were prepared in the same manner as in Example 8, except that the low refractive index layer were formed in the same manner as in Examples 13 to 26 and Comparison Examples 6 to 11 respectively.

The surface reflection and the surface hardness of the films were evaluated in the same manner as in Examples 13 to 26 and Comparison Examples 6 to 11. The results are set forth in Table 8.

TABLE 8

| Film No. | Particles | | Binder polymer | | Reflectance | Hardness |
|---|---|---|---|---|---|---|
| | No. | Amount | No. | Amount | | |
| Ex. 27 | PP-11 | 90 | BP-3 | 10 | 0.4% | A |
| Ex. 28 | PP-11 | 80 | BP-3 | 20 | 0.5% | A |
| Ex. 29 | PP-12 | 95 | BP-2 | 5 | 0.4% | A |
| Ex. 30 | PP-12 | 90 | BP-2 | 10 | 0.5% | A |
| Ex. 31 | PP-13 | 90 | BP-1 | 10 | 0.4% | A |
| Ex. 32 | PP-14 | 90 | BP-3 | 10 | 0.3% | A |
| Ex. 33 | PP-15 | 90 | BP-1 | 10 | 0.4% | A |
| Ex. 34 | PP-15 | 90 | BP-3 | 10 | 0.4% | A |
| Ex. 35 | PP-16 | 90 | BP-2 | 10 | 0.4% | A |
| Ex. 36 | PP-17 | 90 | BP-1 | 10 | 0.4% | A |
| Ex. 37 | PF-18 | 90 | BP-3 | 10 | 0.4% | A |
| Ex. 38 | PP-18 | 80 | BP-3 | 20 | 0.5% | A |
| Ex. 39 | PP-19 | 90 | BP-2 | 10 | 0.4% | A |
| Ex. 40 | PP-20 | 90 | BP-1 | 10 | 0.4% | A |
| Comp. 12 | PP-10 | 100 | None | — | 0.4% | C |
| Comp. 13 | PP-61 | 80 | BP-1 | 20 | 1.9% | C |
| Comp. 14 | PP-12 | 100 | None | — | 0.4% | C |
| Comp. 15 | PP-62 | 80 | BP-2 | 20 | 0.5% | C |
| Comp. 16 | PP-19 | 100 | None | — | 0.4% | B |
| Comp. 17 | PP-63 | 80 | BP-3 | 20 | 0.5% | B |

EXAMPLE 41

The anti-reflection film prepared in Example 27 was attached to a display surface of a liquid crystal display of a personal computer (PC9821Ns/340W, Nippon Electric Co., Ltd.). The phenomenon of displaying a background view on the surface was observed. As a result, the phenomenon of displaying a background view on the surface was greatly reduced, and the displayed image was easily observed.

The anti-reflection films prepared in Examples 30, 37 and 39 were evaluated in the same manner. As a result, the phenomenon of displaying a background view on the surface was greatly reduced, and the displayed image was easily observed.

EXAMPLE 42

An anti-reflection film prepared in Example 27, except that a polarizing plate having a surface subjected to an anti-glare treatment (Haze: 9%, Sumicharane AG2, Sumitomo Chemical Co., Ltd.) was used as the transparent support. The haze of the film was 9%. A liquid crystal display (LCD) was prepared by using the polarizing plate having the anti-reflection film. As a result, the phenomenon of displaying a background view on the surface was greatly reduced, and the displayed image was easily observed.

We claim:

1. An anti-reflection film comprising a transparent support and a low refractive index layer having a refractive index of not higher than 1.45, said low refractive index layer comprising a binder polymer and micro polymer particles, said micro polymer particles being superposed upon each other to form micro voids surrounded by the particles, and said micro polymer particles having a mean particle size in the range of 5 to 200 nm, wherein the particles comprise a cross-linked polymer.

2. The anti-reflection film as defined in claim 1, wherein the polymer particle is formed by polymerization of ethylenically unsaturated monomers, at least 5 mole % of said monomers having two or more ethylenically unsaturated bonds.

3. The anti-reflection film as defined in claim 2, wherein at least 20 mole % of said monomers have two or more ethylenically unsaturated bonds, whereby micro voids are formed inside the particles in addition to the micro voids surrounded by the particles.

4. The anti-reflection film as defined in claim 1, wherein the polymer of the particles contains fluorine atoms in an amount of 15 to 75 weight %.

5. The anti-reflection film as defined in claim 1, wherein the micro void is formed in an amount of 3 to 50 volume % of the low refractive index layer.

6. The anti-reflection film as defined in claim 1, wherein the polymer of the particles is further cross-linked to the polymer of other particles.

7. The anti-reflection film as defined in claim 1, wherein the binder polymer and the polymer of the particles have glass transition temperatures, in which the glass transition temperature of the polymer of the particles is higher than the glass transition temperature of the binder polymer, and the difference between the glass transition temperatures is not smaller than 5° C.

8. The anti-reflection film as defined in claim 1, wherein the binder polymer is cross-linked.

9. The anti-reflection film as defined in claim 1, wherein a high refractive index layer having a refractive index of not lower than 1.6 is provided between the transparent support and the low refractive index layer.

10. A display device having a display surface covered with an anti-reflection film defined in claim 1.

11. An anti-reflection film comprising a transparent support and a low refractive index layer having a refractive index of not higher than 1.45, said low refractive index layer comprising a binder polymer and micro polymer particles, said micro polymer particles being superposed upon each other to form micro voids surrounded by the particles, and said micro polymer particles having a mean particle size in the range of 5 to 200 nm, wherein the particles comprise a polymer cross-linked to the binder polymer.

12. The anti-reflection film as defined in claim 11, wherein the low refractive index layer is formed by coating a photopolymerization initiator, a binder polymer having a reactive group or monomers for the binder polymer and particles comprising a polymer having a reactive group, and irradiating the coated layer with ultraviolet ray to form the covalent bond between the binder polymer and the polymer of the particles.

13. The anti-reflection film as defined in claim 12, wherein each of the reactive groups of the binder polymer and the polymer of the particles is an epoxy group or an ethylenically unsaturated bond.

14. The anti-reflection film as defined in claim 11, wherein the polymer of the particles contains fluorine atoms in an amount of 15 to 75 weight %.

15. The anti-reflection film as defined in claim 11, wherein the micro void is formed in an amount of 3 to 50 volume % of the low refractive index layer.

16. The anti-reflection film as defined in claim 11, wherein the particles have a core-shell structure, said core comprises a cross-linked polymer, and said shell comprises a polymer cross-lined to the binder polymer.

17. The anti-reflection film as defined in claim 11, wherein the binder polymer and the polymer of the particles have glass transition temperatures, the glass transition temperature of the polymer of the particles is higher than the glass transition temperature of the binder polymer, and the difference between the glass transition temperatures is not smaller than 5° C.

18. The anti-reflection film as defined in claim 11, wherein the binder polymer is cross-linked.

19. The anti-reflection film as defined in claim 11, wherein a high refractive index layer having a refractive index of not lower than 1.6 is provided between the transparent support and the low refractive index layer.

20. A display device having a display surface covered with an anti-reflection film defined in claim 11.

* * * * *